M. E. KOEHLER.
MOTOR CYCLE TRAILER.
APPLICATION FILED JAN. 2, 1917.
1,234,043.
Patented July 17, 1917.
3 SHEETS—SHEET 3.
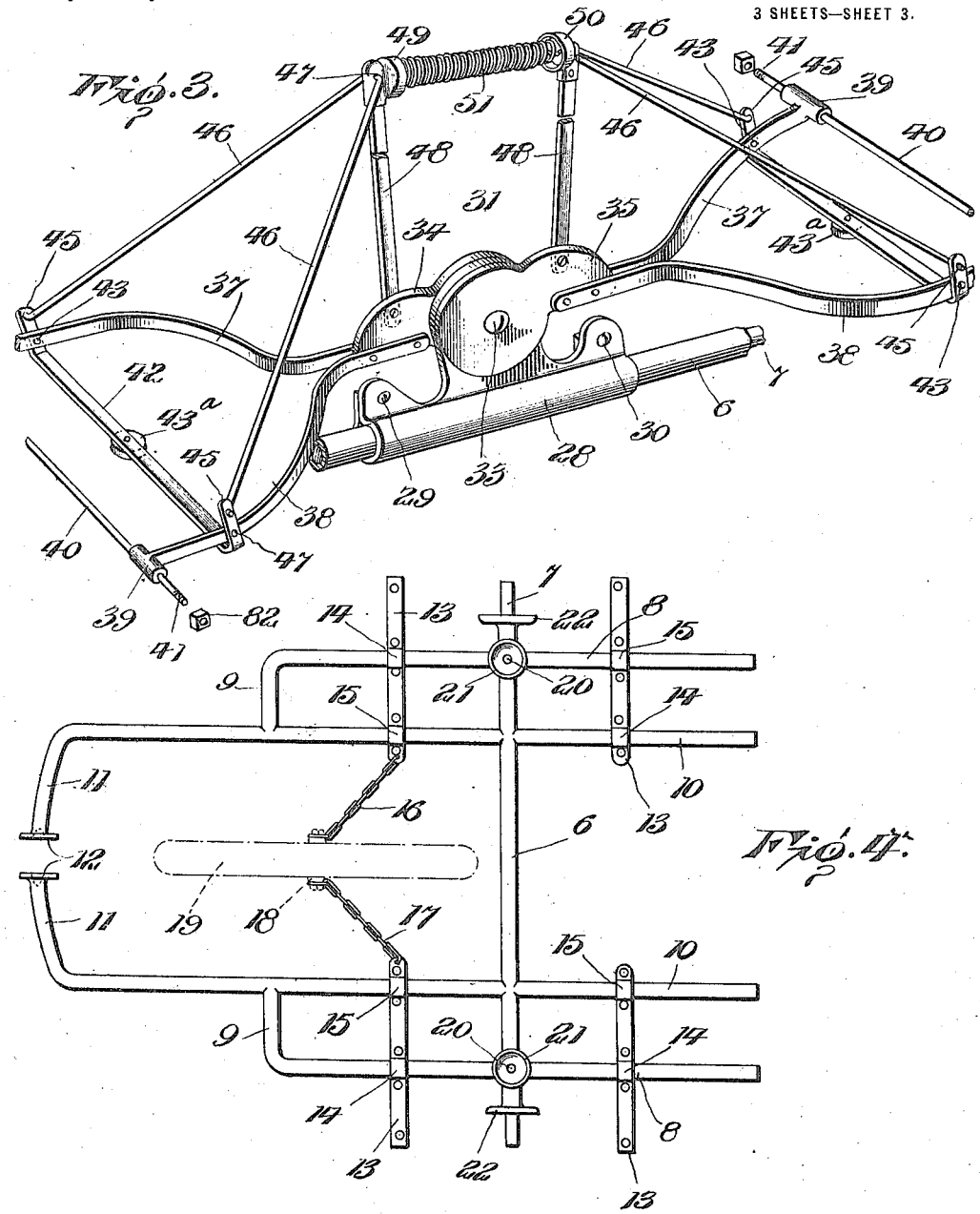
Inventor
Max E. Koehler.
Attorney

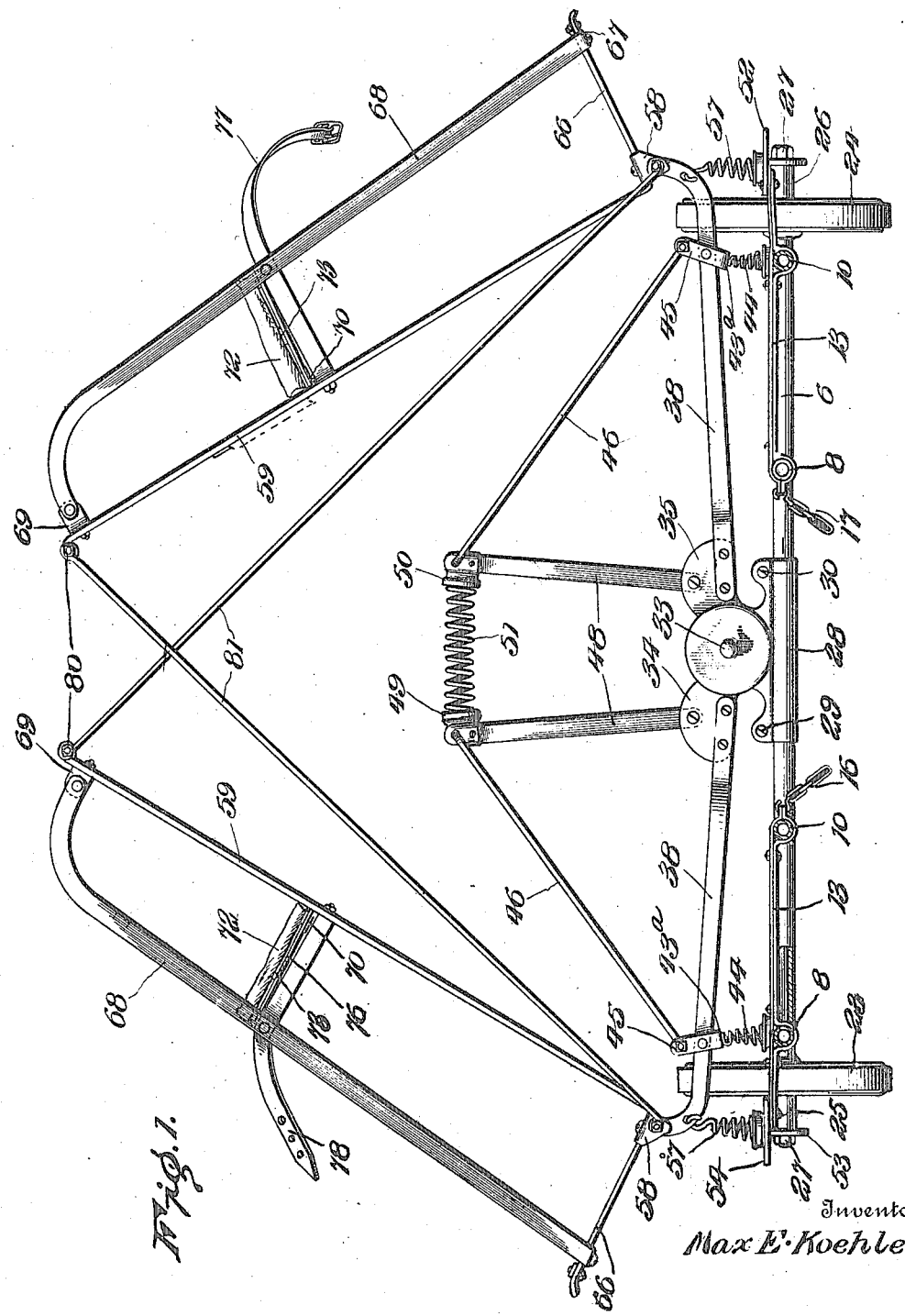

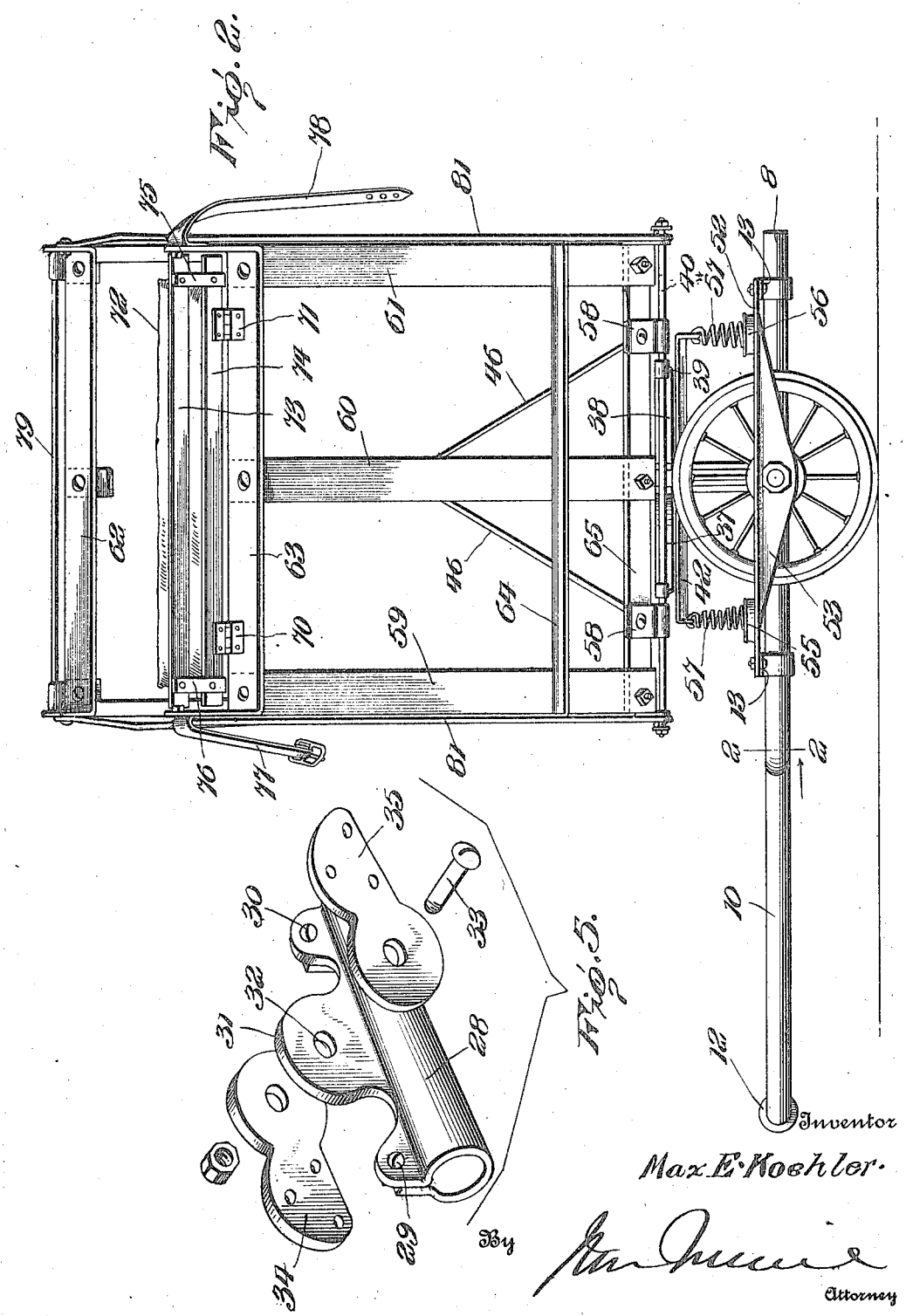

UNITED STATES PATENT OFFICE.

MAXEMILIAN EARNEST KOEHLER, OF WASHBURN, WISCONSIN.

MOTOR-CYCLE TRAILER.

1,234,043.  Specification of Letters Patent.  Patented July 17, 1917.

Application filed January 2, 1917. Serial No. 140,151.

*To all whom it may concern:*

Be it known that I, MAXEMILIAN E. KOEHLER, a citizen of the United States, residing at Washburn, in the county of Bayfield and State of Wisconsin, have invented certain new and useful Improvements in Motor-Cycle Trailers, of which the following is a specification.

This invention relates to trailers, and more particularly to that class of such devices adapted to be used in connection with a motor cycle, to form a simple and effective means for the transportation of additional passengers or freight, and has for its object the construction of a device of the character set forth which shall be able to withstand road conditions and to carry a maximum amount of additional load in order to increase the carrying capacity of the motor cycle.

A secondary feature of the invention is to provide a motor cycle trailer which may be readily attached to or detached from the motor cycle in order to permit the motor cycle being used with or without the trailer attachment.

A further object of the invention is to provide a motor cycle device of the class set forth with cushioning means whereby the same may be ridden comfortably by additional passengers, or breakable freight carried thereby without additional danger from road jar or shocks.

A still further object of the invention is the provision of a device of the character set forth which shall be cheap to manufacture, simple in design, and provided with a body construction which increases the carrying capacity of the truck.

With the foregoing and other objects in view as will from time to time hereinafter appear, this invention consists in the peculiar combination and arrangement of the various coöperating elements and parts of construction of a motor cycle trailer as described in the following specification and more particularly pointed out in the appended claims.

Referring to the accompanying drawings illustrating a preferred embodiment of this invention and in which the same reference characters indicate the same parts wherever used, Figure 1 is a front elevation of the device partly in section.

Fig. 2 is a side elevation.

Fig. 3 is a detail perspective view of the frame-work;

Fig. 4 is a top plan view of the chassis.

Fig. 5 is a detail perspective view showing the parts of the central suspension member in separated relation.

The trailer comprises a chassis composed of bicycle tubing or suitable material comprising an axle carrying member 6, carrying an axle 7, the said member 6 having extending therefrom a plurality of side bars 8—8, which are also connected with the axle carrying member 6, and are provided with angular extensions 9, suitably connected to a main frame-work comprising longitudinally extending bars 10—10, having their forward portions bent to form angular members 11—11, provided with clamping means 12, adapted to be fastened in any suitable manner to the frame-work of the motor cycle. Connecting each pair of bars 8 and 10 is a member 13, formed of strap iron looped upon itself and having portions 14 and 15 expanded to form bearings for the bars 8 and 10. The inner ends of the members 13 carry chains 16 and 17, which are adapted to be fastened to the rear axle 18 of the motor cycle wheel 19 in order to afford additional coupling means for the trailer to the motor cycle in addition to the clamps 12. At the junction point 20 of the bars 8 and 10 there is placed a suitable spring support 21, the purpose of which will be hereafter explained. Adjacent each extremity of the axle 7, the axle housing is flanged at 22 to prevent lateral movement of the wheels 23 and 24 journaled thereon and adapted to be held in place by means of bushings 25 and 26 held upon the axle by nuts 27. The axle housing 6 carries by means of a clamp 28, secured in place by means of the bolts 29 and 30, an upstanding portion 31 provided with a central aperture 32, the member 31 supporting by means of a central blade 33, passing through the aperture 32, oppositely extending wing members 34 and 35, each of which carry members 37 and 38 bent to form a Y-shaped member. Each of the members 37 and 38 is provided at its outer extremity with bearings 39, which support a longitudinally extending rod 40, threaded at 41 for a purpose hereafter set forth. Intermediate the ends of the rods 38 is placed a longitudinally extending cross bar 42, secured by means of rivets 43 to the members 37 and 38 and having centrally mounted thereon a spring support 43ª which is positioned directly above the spring support 21 and adapted to house therebetween a coil spring 44. The members 42 are provided with upturned ends 45 which carry one-piece rods 46—46 extending upwardly and through an aperture 47 in the outer extremities of members 48—48 carried respectively by the wing members 34 and 35 and having spring supporting members 49 and 50 at the respective ends thereof, the said spring supports being adapted to house between them a coil spring 51.

Each end of the axle 7 is provided intermediate the nut 27 in the bushing 25 with a longitudinally extending frame member 52 comprising an axle engaging portion 53 and a top portion 54 which carries spring supports 55 and 56 adapted to support coil springs 57, the upper ends of which are attached to the members 37 and 38. Each of the rods 40 carried by the members 37 and 38 supports through the medium of ears 58—58 a freight or passenger carrying member comprising the frame-work formed of vertically extending bars 59, 60 and 61 and longitudinally extending bars 62, 63, 64 and 65, the lower ends of the members 59 and 61 being bent outwardly to form portions 66 connected by means of bars 67 bent upwardly to form additional side bars 68 fastened to ears 69—69 on the members 62. To the member 63 is hinged by means of hinges 70 and 71 a seat member 72 comprising two slats 73 and 74 secured together by means of transverse cross pieces 75 and 76, the members 59 and 61 carrying straps 77 and 78 adapted to be buckled across in front of the members 68 to hold the occupant of the seat in position. Connecting the members 59 and 61 is a rod 79 provided at its outer ends with nuts 80 which hold rods 81. The rods extend from the rod 79 on one side of the trailer to the rod 40 on the opposite side of said trailer, the rods 81 being held to rod 40 by means of nuts 82 engaging the threaded portions 41.

In operation the device is clamped in the side bars of the frame of the motor cycle by means of clamps 12, and the chains 16—17 are secured in the rear axle thereof in any suitable manner. In this position the trailer is adapted to coöperate with the motor cycle to be drawn thereby, and all road shocks which are received by the wheels 23—24 are cushioned by the springs 57 and 44, the body members 38 carried by the members 34—35 pivoting upon the member 33 in frictional contact with the member 31, this movement being further cushioned by the action of the spring 51, confined between the members 48. Should it be desired at any time to use the device for carrying freight, the seats 72 may be folded upwardly about the hinges 70—71, as shown in dotted lines in the right-hand member of Fig. 1, when a trunk or other article of freight may be placed on the members 66 resting inwardly upon the back portions 59, 60 and 61 serving to securely support the same, and as an additional precaution the straps 77—78 may be placed about the article. By the construction above described the road shocks are reduced as far as possible through the action of the various springs and the frictional contact of the central member shown in separated relation in Fig. 5.

I realize that considerable variation in the specific details as herein set forth may be resorted to without departing from the spirit of my invention, and it is therefore not my intention to limit myself to the specific construction herein shown and described, but to construe the following claims as broadly as the state of the prior art will permit.

Having thus described my invention what I claim and desire to secure by U. S. Letters Patent is:—

1. A trailer comprising a frame, a central support carried by said frame, members pivotally mounted on and extending from said central support, passenger carrying members carried by each of said centrally supported pivoted members, and springs between said centrally supported members to cushion same.

2. A trailer comprising a frame, a central support carried by said frame, members pivotally mounted on and extending from said central support, additional resilient means interposed between the pivotally mounted members to support same, passenger carrying members carried by each of said centrally supported pivoted members, and additional supports extending from the upper portion of each passenger carrying member to the outer end of the centrally supported member on the opposite side of the trailer.

3. A trailer comprising a frame, an axle carried by said frame, wheels on said axle, spring carrying members adjacent said wheels, a central support carried by said axle, a plurality of members extending from said central support, a plurality of springs between said spring carrying members and said centrally supported members, passenger carrying means supported by each of said centrally supported members, and an additional support from each of said centrally supported members to the opposite one of each of the passenger carrying members.

4. A trailer comprising a frame having an axle, a plurality of bars pivotally mounted on said axle, said bars extending in opposite directions, an extension on each of said bars, cushioning means between said bars and the frame, cushioning means between the extensions, and means carried on the bars for supporting a load.

5. A trailer comprising a frame having an axle, a plurality of bars pivotally mounted on said axle, an extension on each of said bars, cushioning means between said bars and the frame, cushioning means between the extensions, means for connecting the respective bars and extensions, and means on the outer end of the bars for supporting a load.

6. A trailer comprising a frame having an axle, a plurality of bars pivotally mounted on said axle, an extension on each of said bars, cushioning means between the bars and the frame, cushioning means between the extensions, means for connecting the respective bars and extensions, and means at the outer ends of bars to support a load and means connecting the load supporting means on one side the trailer with the bars on the opposite sides thereof.

7. A trailer comprising a frame, an axle on said frame, a bar carried by said axle, a plurality of pivoted members carried by said bar, a plurality of horizontally extending load supports carried by said members, vertically extending bars carried by said pivoted members, cushioning means between said horizontal bars and the frame, and cushioning means between the vertical bars.

8. A trailer comprising a frame, an axle on said frame, a bar carried by said axle, a plurality of pivoted members carried by said bar, a plurality of horizontally extending load supports carried by said members, vertically extending bars carried by said pivoted members, cushioning means between said horizontal bars and the frame, cushioning means between the vertical bars, and means supported by said horizontally extending bars adapted to support a load thereon.

9. In a motor cycle trailer, the combination with a frame, of means for releasably fastening same to a motor cycle, an axle, wheels on said axle, a support pivoted on said axle, load carrying members carried by said pivoted support, and means located between the frame and said load carrying members for cushioning the latter.

10. A motor cycle trailer comprising in combination a wheel frame provided with an axle, a member on said axle, a plurality of oppositely extending members pivoted on said first named member, a plurality of vertically extending members on said oppositely extending members, and cushioning means between said vertical members and between said oppositely extending members and the frame.

In testimony whereof I affix my signature in the presence of two witnesses.

MAXEMILIAN EARNEST KOEHLER.

Witnesses:
E. C. ALVORD,
JERUSHA JOHNSON.

Copies of this patent may be obtained for five cents each, by addressing the "Commissioner of Patents, Washington, D. C."